US009940011B2

United States Patent
Kim et al.

(10) Patent No.: US 9,940,011 B2
(45) Date of Patent: Apr. 10, 2018

(54) REMOTE CONTROL DEVICE AND METHOD OF CONTROLLING OTHER DEVICES USING THE SAME

(71) Applicant: SAMSUNG ELECTRONICS CO., LTD., Suwon-si (KR)

(72) Inventors: Dae-Hyun Kim, Suwon-si (KR); Seung-dong Yu, Osan-si (KR); Woo-yong Chang, Yongin-si (KR); Eun-hee Park, Suwon-si (KR); Chang-hwan Hwang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 98 days.

(21) Appl. No.: 14/284,100

(22) Filed: May 21, 2014

(65) Prior Publication Data
US 2014/0258909 A1    Sep. 11, 2014

Related U.S. Application Data

(63) Continuation of application No. 12/481,978, filed on Jun. 10, 2009, now abandoned.

(30) Foreign Application Priority Data

Oct. 23, 2008 (KR) .......................... 10-2008-0104261

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0482* (2013.01); *G06F 3/0483* (2013.01);
(Continued)

(58) Field of Classification Search
CPC .. G06F 3/0482; G06F 3/0483; G06F 3/04842; G06F 3/0488; H04N 2005/443; H04N 21/42224
See application file for complete search history.

(56) References Cited

U.S. PATENT DOCUMENTS

| 5,410,326 A | 4/1995 | Goldstein |
| 6,211,856 B1 * | 4/2001 | Choi ..................... G06F 3/0481 345/173 |

(Continued)

FOREIGN PATENT DOCUMENTS

| JP | 2005-136518 A | 5/2005 |
| JP | 2005-175801 A | 6/2005 |

(Continued)

OTHER PUBLICATIONS

Communication dated Jul. 30, 2015, issued by the Korean Intellectual Property Office in counterpart Korean Application No. 10-2008-0104261.

(Continued)

*Primary Examiner* — Afroza Chowdhury
(74) *Attorney, Agent, or Firm* — Sughrue Mion, PLLC

(57) ABSTRACT

Provided is a method of controlling an electronic device by using a remote control device comprising a touch screen, the method including selecting one of a plurality of functions supported by the electronic device via the touch screen, sequentially displaying a plurality of user interfaces, usable for controlling the function selected with an input detected by the touch screen, one-by-one, and controlling the electronic device by using one of the plurality of user interfaces that are sequentially displayed.

12 Claims, 5 Drawing Sheets

(51) Int. Cl.
*G06F 3/0482* (2013.01)
*G06F 3/0483* (2013.01)
*H04N 5/44* (2011.01)
*H04N 21/422* (2011.01)
*G06F 3/0484* (2013.01)

(52) U.S. Cl.
CPC ...... *G06F 3/04842* (2013.01); *G06F 3/04883* (2013.01); *H04N 5/4403* (2013.01); *H04N 21/42209* (2013.01); *H04N 21/42224* (2013.01); *H04N 2005/443* (2013.01)

(56) References Cited

U.S. PATENT DOCUMENTS

| | | | |
|---|---|---|---|
| 7,254,823 B2 | 8/2007 | Knudson | |
| 7,412,653 B2 | 8/2008 | Gates | |
| 7,571,453 B2 | 8/2009 | Knudson | |
| 7,756,916 B2* | 7/2010 | Shikata | G06F 17/30554 707/706 |
| 7,779,440 B2 | 8/2010 | Knudson | |
| 7,831,930 B2 | 11/2010 | Dresti et al. | |
| 7,937,727 B2 | 5/2011 | Knudson | |
| 7,941,316 B2 | 5/2011 | Mahajan et al. | |
| 7,948,476 B2* | 5/2011 | Goto | G06F 3/0488 345/173 |
| 8,054,294 B2 | 11/2011 | Sakai et al. | |
| 8,063,923 B2 | 11/2011 | Lilleness et al. | |
| 8,150,387 B2 | 4/2012 | Klein et al. | |
| 8,281,252 B2 | 10/2012 | Kapanen et al. | |
| 8,863,184 B2* | 10/2014 | Arling | H04H 60/46 348/739 |
| 9,182,885 B2* | 11/2015 | Ruscher | G06F 3/0482 |
| 2001/0015719 A1* | 8/2001 | Van Ee | G06F 3/04847 345/158 |
| 2002/0140571 A1 | 10/2002 | Hayes et al. | |
| 2002/0140855 A1 | 10/2002 | Hayes et al. | |
| 2002/0143805 A1 | 10/2002 | Hayes et al. | |
| 2003/0025840 A1* | 2/2003 | Arling | G08C 17/00 348/734 |
| 2003/0041334 A1* | 2/2003 | Lu | H04L 29/06027 725/113 |
| 2003/0159146 A1* | 8/2003 | Kim | H04N 5/44543 725/46 |
| 2004/0090390 A1 | 5/2004 | Mason et al. | |
| 2004/0113892 A1 | 6/2004 | Mears et al. | |
| 2005/0076393 A1 | 4/2005 | Sussman | |
| 2005/0080496 A1 | 4/2005 | Hayes et al. | |
| 2005/0149972 A1 | 7/2005 | Knudson | |
| 2005/0200611 A1* | 9/2005 | Goto | G06F 3/0488 345/173 |
| 2005/0212979 A1 | 9/2005 | Morita et al. | |
| 2005/0216606 A1 | 9/2005 | Hayes et al. | |
| 2005/0235209 A1 | 10/2005 | Morita et al. | |
| 2006/0020969 A1 | 1/2006 | Utsuki et al. | |
| 2006/0050142 A1* | 3/2006 | Scott | G08C 17/02 348/14.05 |
| 2006/0053472 A1* | 3/2006 | Goto | H04N 5/4403 725/141 |
| 2006/0282407 A1* | 12/2006 | Shikata | G06F 17/30991 |
| 2007/0025311 A1* | 2/2007 | Jeong | G06F 3/0482 370/338 |
| 2007/0057762 A1 | 3/2007 | Han et al. | |
| 2007/0100635 A1 | 5/2007 | Mahajan et al. | |
| 2007/0136693 A1 | 6/2007 | Lilleness et al. | |
| 2007/0152981 A1* | 7/2007 | Im | G06F 3/03547 345/173 |
| 2007/0168369 A1 | 7/2007 | Bruns | |
| 2007/0229465 A1 | 10/2007 | Sakai et al. | |
| 2007/0256103 A1 | 11/2007 | Knudson | |
| 2007/0278320 A1 | 12/2007 | Lunacek et al. | |
| 2008/0005764 A1* | 1/2008 | Arling | H04H 60/46 725/39 |
| 2008/0062141 A1 | 3/2008 | Chandhri | |
| 2008/0082208 A1 | 4/2008 | Hong et al. | |
| 2008/0104655 A1 | 5/2008 | Hayward | |
| 2008/0115091 A1 | 5/2008 | Jung et al. | |
| 2008/0168501 A1 | 7/2008 | Migos et al. | |
| 2008/0172695 A1 | 7/2008 | Migos et al. | |
| 2008/0180228 A1* | 7/2008 | Wakefield | G01S 5/0252 340/4.62 |
| 2008/0222675 A1 | 9/2008 | Moshiri et al. | |
| 2009/0002335 A1 | 1/2009 | Chaudhri | |
| 2009/0058872 A1 | 3/2009 | Boettcher et al. | |
| 2009/0061837 A1 | 3/2009 | Chaudhri et al. | |
| 2009/0064055 A1* | 3/2009 | Chaudhri | G06F 3/04817 715/863 |
| 2009/0146860 A1 | 6/2009 | Kwon | |
| 2009/0152445 A1 | 6/2009 | Gardner, Jr. | |
| 2009/0174653 A1 | 7/2009 | Shin et al. | |
| 2009/0174680 A1 | 7/2009 | Anzures et al. | |
| 2009/0175509 A1 | 7/2009 | Gonion et al. | |
| 2009/0253463 A1* | 10/2009 | Shin | H04M 1/72583 455/563 |
| 2010/0020027 A1 | 1/2010 | Park et al. | |
| 2010/0103125 A1* | 4/2010 | Kim | G06F 3/0482 345/173 |
| 2010/0162160 A1 | 6/2010 | Stallings et al. | |
| 2010/0251178 A1 | 9/2010 | Lee et al. | |
| 2010/0317332 A1* | 12/2010 | Bathiche | H04L 12/282 455/418 |

FOREIGN PATENT DOCUMENTS

KR 10-2006-0041634 A 5/2006
KR 10-2008-0029548 A 4/2008
KR 10-0826194 B1 4/2008

OTHER PUBLICATIONS

Communication dated Jan. 30, 2015 issued by the Korean Intellectual Property Office in counterpart Korean Patent Application No. 10-2008-0104261.

Communication dated Oct. 21, 2015, issued by the Korean Intellectual Property Office in counterpart Korean Application No. 10-2015-0123056.

Communication dated Apr. 29, 2016 issued by the Korean Intellectual Property Office in counterpart Korean Application No. 10-2015-0123056.

Communication dated Aug. 23, 2016 issued by Korean Intellectual Property Office in counterpart Korean Application No. 10-2016-0081958.

Communication issued May 11, 2017 by the Korean Intellectual Property Office in counterpart Korean Patent Application No. 10-2008-104261.

\* cited by examiner

REMOTE CONTROL DEVICE AND METHOD OF CONTROLLING OTHER DEVICES USING THE SAME

CROSS-REFERENCE TO RELATED PATENT APPLICATION

This is a continuation application of U.S. patent application Ser. No. 12/481,978, which claims priority from Korean Patent Application No. 10-2008-0104261, filed on Oct. 23, 2008, in the Korean Intellectual Property Office, the disclosures of which are incorporated herein in their entirety by reference.

BACKGROUND OF THE INVENTION

1. Field of the Invention

Apparatuses and methods consistent with the present invention relate to a remote control device and a method of controlling other devices using the remote control device.

2. Description of the Related Art

Recent electronic devices have remote control devices for remote controlling the electronic devices. For example, TVs, CD players, DVD players, and video recorders have their corresponding remote control devices. However, if each of the electronic devices has a remote control device different from the others, too many remote control devices for remote controlling the electronic devices are required. Thus, a universal remote control device is suggested to resolve the problem.

FIG. 1 is a diagram of a universal remote control device according to related art.

Referring to FIG. 1, the universal remote control device according to the related art includes a touch screen 110 and buttons 120.

The touch screen 110 detects a touch, and displays user interfaces corresponding to each electronic device.

The buttons 120 include volume adjust buttons, channel switch buttons, directional buttons, etc.

Accordingly, a universal remote control device is capable of remote controlling various electronic devices by including the touch screen 110.

SUMMARY OF THE INVENTION

Exemplary embodiments of the present invention provide a remote control device and a method of controlling other devices using the same.

According to an exemplary embodiment of the present invention, there is provided a method of controlling an electronic device by using a remote control device including a touch screen, the method including selecting one of a plurality of functions supported by the electronic device via the touch screen; sequentially displaying a plurality of user interfaces, usable for controlling the function selected with an input detected by the touch screen, one-by-one; and controlling the electronic device by using one of the plurality of user interfaces that are sequentially displayed.

The selected function may be a function of switching channels.

The plurality of user interfaces may include at least two of a user interface for switching channels up/down, a user interface for inputting channel numbers, and a user interface for displaying a list of channels.

A user interface, which is either the most frequently used user interface or a user interface designated by a user in advance, may be displayed first in the displaying of the plurality of user interfaces.

The input detected by the touch screen may be performed by touching the touch screen.

The input detected by the touch screen may be performed by sliding from a first location to a second location across the touch screen.

A user interface for controlling a function relevant to a task currently performed by the electronic device may be further displayed when the plurality of user interfaces are sequentially displayed one-by-one.

When the task is completed, a user interface for controlling a function relevant to the task may be no longer displayed in the displaying of the plurality of user interfaces.

According to another exemplary embodiment of the present invention, there is provided a remote control device for controlling an electronic device, the remote control device including a touch screen which detects an input for selecting one of a plurality of functions supported by the electronic device and sequentially displays a plurality of user interfaces for controlling the selected function one-by-one each time an input in a predetermined form is detected; and a control unit which controls the electronic device by using one of the plurality of user interfaces that are sequentially displayed.

According to another exemplary embodiment of the present invention, there is provided a computer readable recording medium having recorded thereon a program for executing a method of controlling an electronic device by using a remote control device including a touch screen, the method including selecting one of a plurality of functions supported by the electronic device via the touch screen; sequentially displaying a plurality of user interfaces, usable for controlling the function selected with an input detected by the touch screen, one-by-one; and controlling the electronic device by using one of the plurality of user interfaces that are sequentially displayed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
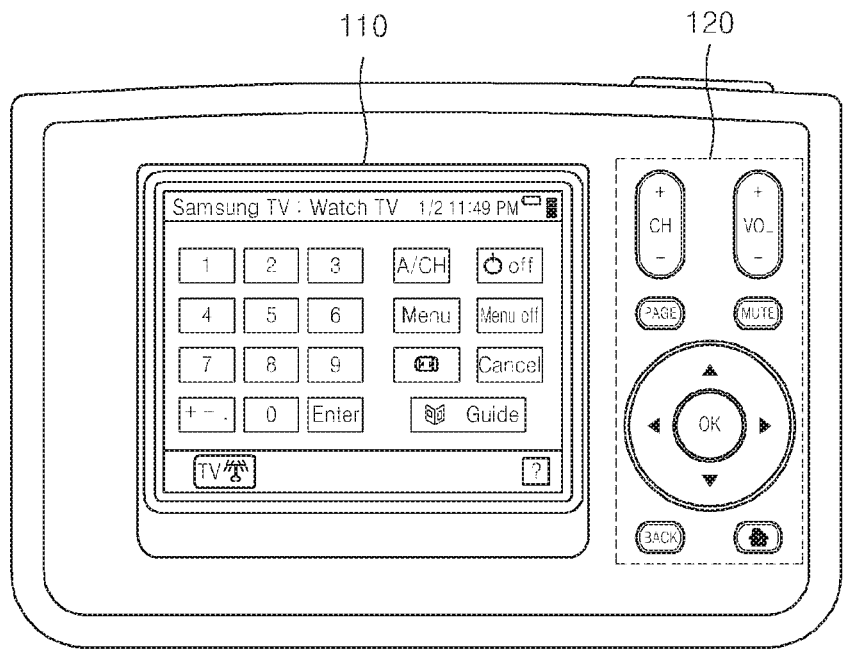
FIG. 1 is a diagram of a universal remote control device according to related art.
Figure 2:
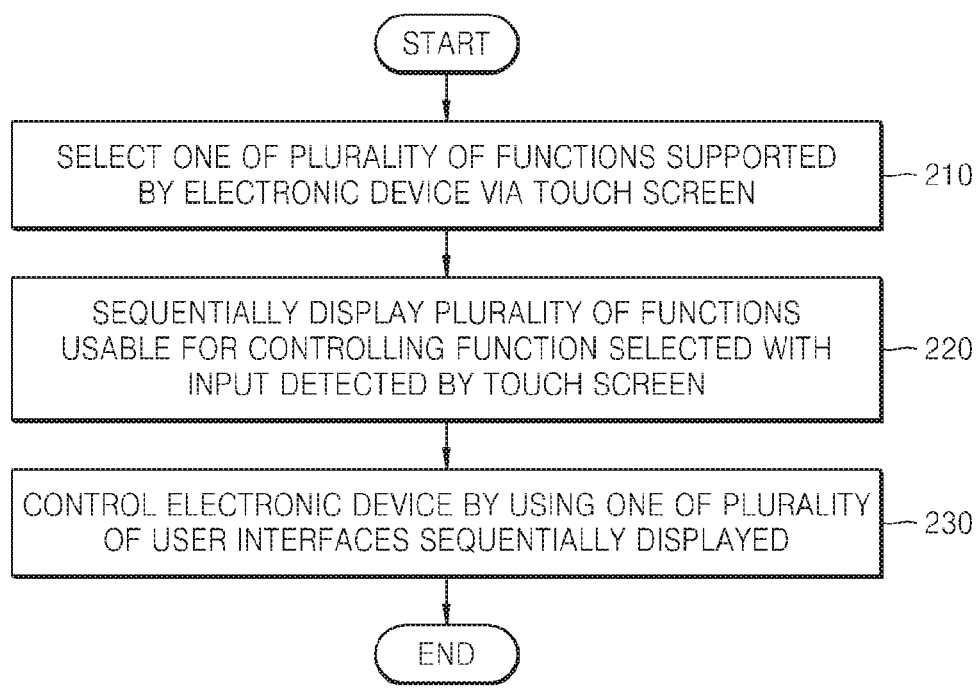
FIG. 2 is a flowchart of a method of controlling an electronic device by using a remote control device, according to an exemplary embodiment of the present invention.

FIG. 2 is a flowchart of a method of controlling an electronic device by using a remote control device, according to an exemplary embodiment of the present invention.

In operation 210, one of a plurality of functions supported by the electronic device is selected via a touch screen.

Here, the electronic device that can be controlled by using a remote control device may be a TV, a CD player, a DVD player, a video recorder, etc.

Also, according to another exemplary embodiment, an operation of selecting an electronic device to be remote controlled from among a plurality of electronic devices may further be performed.

In operation 220, according to a touch detected by the touch screen, a plurality of user interfaces, which can be used for controlling a function selected with the touch, are sequentially displayed one-by-one.

In an exemplary embodiment, an exemplary function supported by the electronic device may be a channel switching function; however, the present invention is not limited thereto and thus the functions supported by the electronic device can be other functions.

Furthermore, the touch screen may display the most frequently used user interface first from among a plurality of user interfaces. Additionally, the touch screen may display a predetermined user interface first, according to a user configuration.

For example, a user interface for controlling a channel switching function of a TV may include a user interface for switching channels up/down, a user interface for inputting specific channel numbers, a user interface for displaying a list of channels, etc. Here, in the case where the user interface for inputting specific channel numbers is the most frequently used user interface, the user interface for inputting specific channel numbers may be displayed first with respect to the channel switching function.

According to another exemplary embodiment of the present invention, one of a plurality of user interfaces for controlling selected functions is displayed on the entire touch screen, as described above. Thus, a user can operate a remote control device easier than the prior art in which a user interface for controlling all functions supported by an electronic device is displayed on the entire touch screen.

In operation 230, the electronic device is controlled by using one of a plurality of user interfaces sequentially displayed one-by-one.

For example, a user can change a channel of a TV by using one of a plurality of user interfaces for controlling a channel switching function.

Figure 3:
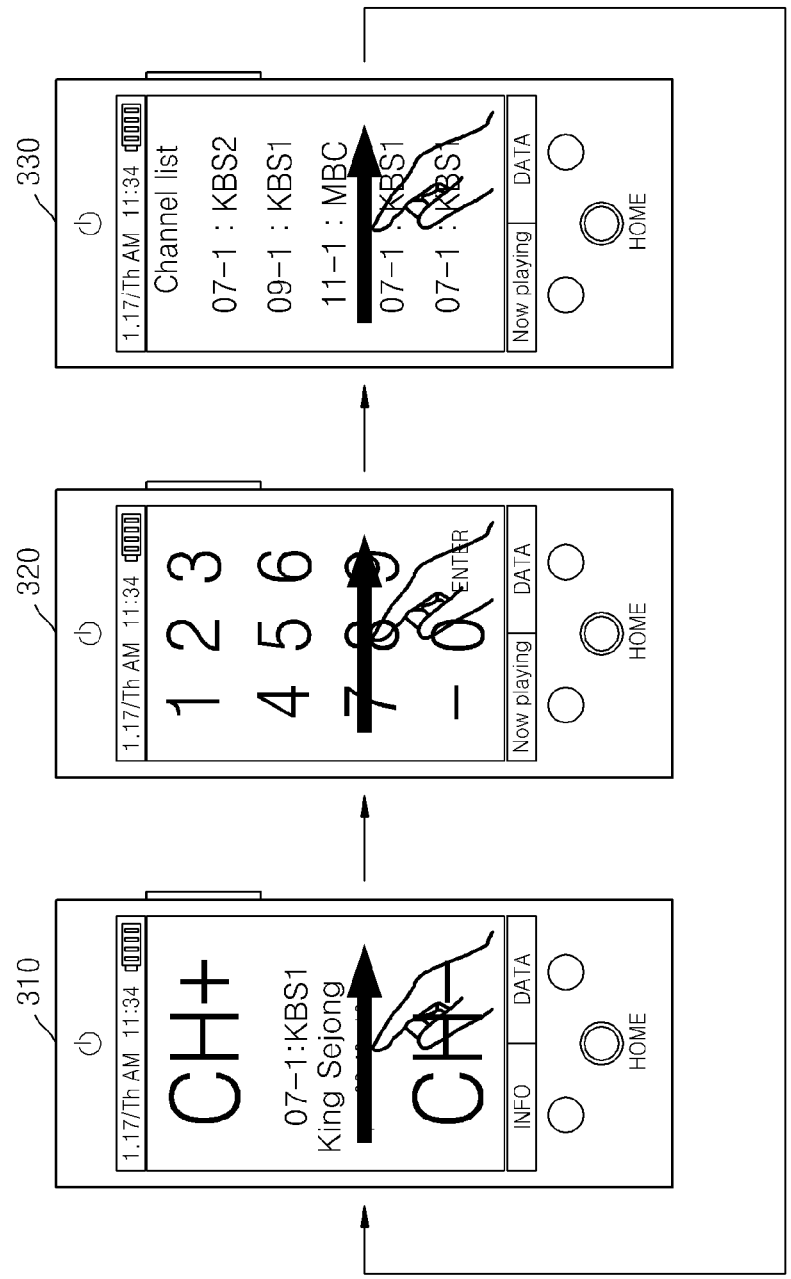
FIG. 3 is a diagram for describing a method of operating a remote control device, according to an exemplary embodiment of the present invention.

FIG. 3 is a diagram for describing a method of operating a remote control device, according to an exemplary embodiment of the present invention.

Referring to FIG. 3, first through third user interfaces 310, 320, and 330 for controlling a channel switching function of a TV are displayed on a touch screen of the remote control device according to an exemplary embodiment of the present invention.

The first user interface 310 is a user interface for switching channels of a TV up/down. When a user touches a region "CH+" displayed on the touch screen of the remote control device, a current channel is switched to a higher channel. When a user touches a region "CH−" displayed on the touch screen of the remote control device, a current channel is switched to a lower channel.

The second user interface 320 is a user interface for inputting specific channel numbers. A user can switch channels of a TV by inputting specific channel numbers by using number regions displayed on the touch screen of the remote control device.

The third user interface 330 is a user interface for displaying a list of channels supported by a TV. A user can switch channels of the TV by selecting one of the channels in the displayed list of channels.

At this point, a user may switch user interfaces displayed on the touch screen by sliding the finger from the left to the right across the touch screen of the remote control device, as shown in FIG. 3.

The action of sliding the finger in a predetermined direction across a touch screen is called 'rubbing.' For example, when the first user interface 310 is displayed on the touch screen, if a user rubs the touch screen to the right, the second user interface 320 is displayed on the touch screen.

Accordingly, in an exemplary embodiment, user interfaces from the first user interface 310 to the third user interface 330 are sequentially displayed on the touch screen every time a user rubs the touch screen. At this point, in an exemplary embodiment, if a user rubs the touch screen when the third user interface 330 is displayed, the first user interface 310 is displayed again. Accordingly, the first through third user interfaces 310, 320 and 330 are recursively displayed.

Also, according to another exemplary embodiment, a menu for switching user interfaces to be displayed on the touch screen may further be displayed on the touch screen, other than the first through third user interfaces 310, 320 and 330.

For example, although not shown in FIG. 3, menus indicated by texts such as "previous" and "next" may further be displayed in the topmost or the bottommost region of the touch screen.

If the second user interface 320 is displayed on the touch screen with the menus, as described above, a user may touch the "previous" menu to display the first user interface 310 on the touch screen or touch the "next" menu to display the third user interface 313 on the touch screen.

However, the menus described above are not limited thereto, and may include all types of menus for instructing to switch between a current user interface and another user interface. For example, the menus may be graphically indicated such as with arrows.

Figure 4:
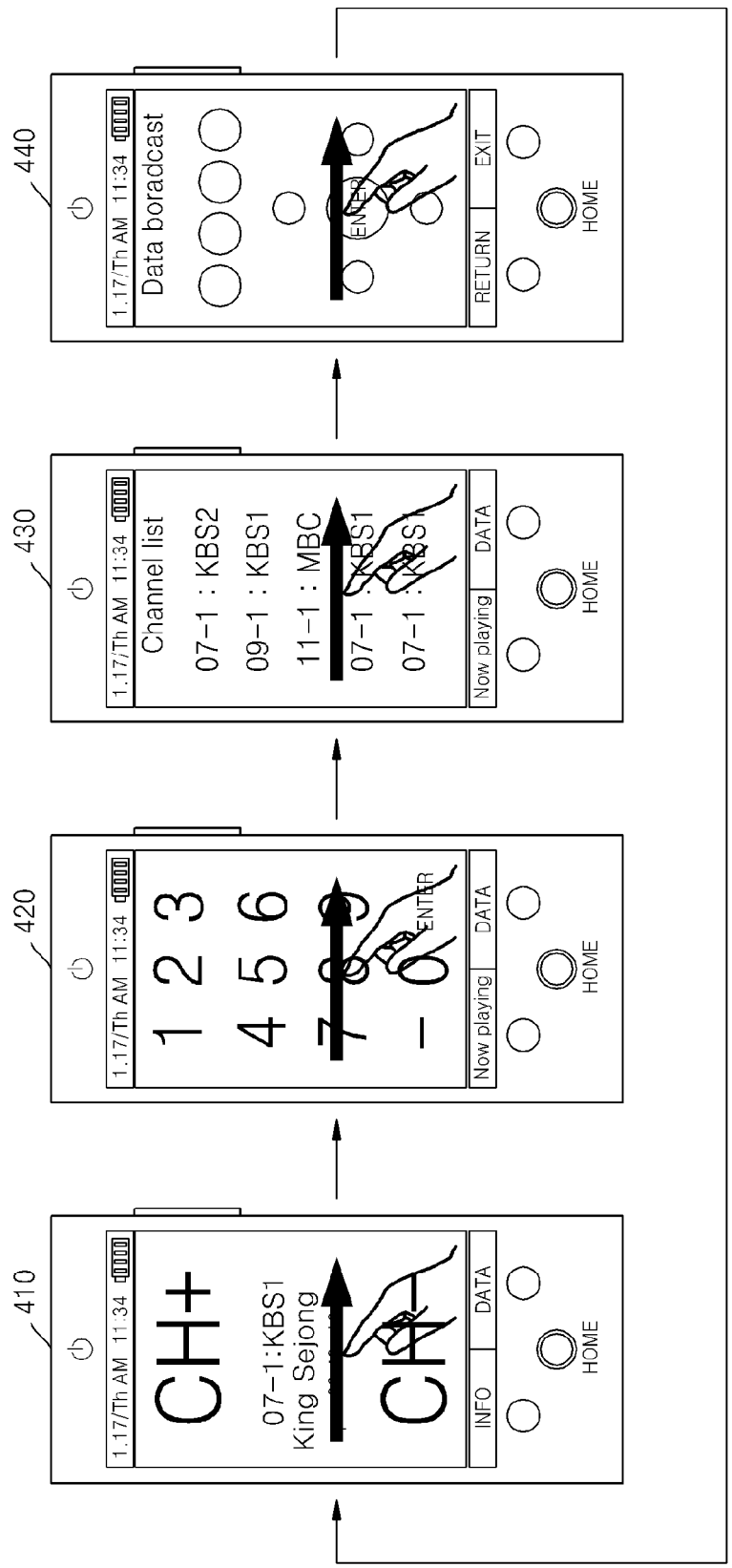
FIG. 4 is a diagram for describing a method of operating a remote control device, according to another exemplary embodiment of the present invention.

FIG. 4 is a diagram for describing a method of operating a remote control device, according to another exemplary embodiment of the present invention.

Referring to FIG. 4, first through third user interfaces 410, 420, and 430 for controlling a channel switching function and a fourth user interface 440 for setting up digital broadcast environments are displayed on a touch screen of the remote control device according to an exemplary embodiment of the present invention.

Here, the first through third user interfaces 410, 420, and 430 correspond to the first through third user interfaces 310, 320, and 330, as described above, respectively, and thus, detailed descriptions thereof will be omitted here.

The fourth user interface 440 is a user interface for setting up digital broadcast environments, and is displayed in the case where content broadcasted on a channel switched by a user is digital broadcast content.

Accordingly, in another exemplary embodiment of the present invention, a user interface for controlling a function relevant to a task currently performed by an electronic device can further be displayed with the first through third user interfaces 410, 420, and 430 for controlling a selected function.

According to another exemplary embodiment of the present invention, in the case where, while a user watches a digital broadcast, it is necessary to input characters regarding the digital broadcast, the touch screen may further display a user interface via which the user can input characters, other than the fourth user interface 440 for setting up digital broadcast environments.

Furthermore, the first through fourth user interfaces 410, 420, 430, and 440 are recursively displayed as in the previously discussed exemplary embodiment of FIG. 3.

Figure 5:
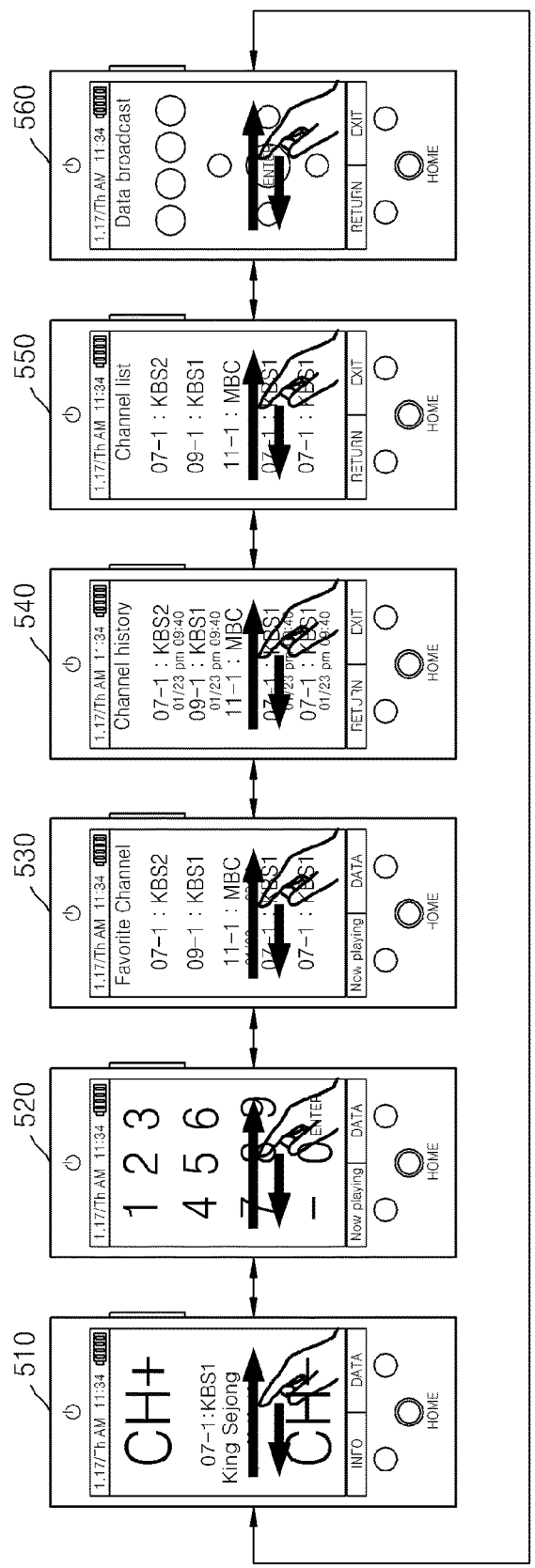
FIG. 5 is a diagram for describing a method of operating a remote control device, according to another exemplary embodiment of the present invention.

FIG. 5 is a diagram for describing a method of operating a remote control device, according to another embodiment of the present invention.

Referring to FIG. 5, first through fifth user interfaces 510, 520, 530, 540, and 550 for controlling a channel switching function of a TV and a sixth user interface 560 for setting up digital broadcast environments are displayed on a touch screen of the remote control device according to an exemplary embodiment of the present invention.

Here, the first, the second, the fifth, and the sixth user interfaces 510, 520, 550, and 560 correspond to the first through fourth user interfaces 310, 320, 330, and 340, as described above, respectively. Thus, detailed descriptions thereof will be omitted.

The third user interface 530 of FIG. 5 is a user interface for displaying a list of preferred channels. Since a user selects a channel from a list of channels, which are preferred by the user, displayed on the touch screen, the user can easily select a channel to watch.

The fourth user interface 540 is a user interface for displaying the history of channel selections. A user can select one of the channels the user has previously watched from the history of channel selections displayed on the touch screen.

Also, in an exemplary embodiment as shown in FIG. 5, rubbing can be performed in both directions as compared to the embodiments of FIGS. 3 and 4 in which rubbing has only been shown to be performed in one direction.

For example, the first user interface 510 is displayed on the touch screen if a user rubs the user interface 520 to the left, or the third user interface 530 is displayed on the touch screen if the user rubs the user interface 520 to the right.

However, the directions of rubbing are not limited to horizontal directions, and rubbing may be performed in vertical directions or diagonal directions according to exemplary embodiments.

Also, according to another exemplary embodiment, from among the first through sixth user interfaces 510 through 560 shown in FIG. 5, a user interface with respect to functions not required for a task currently performed by an electronic device may not be displayed on the touch screen.

For example, in the case where content broadcasted on a channel switched by a user is not digital broadcast content, the sixth user interface 560, which is a user interface for setting up digital broadcast environments, may not be displayed. Therefore, in such cases, the first user interface 510 may be displayed instead of the sixth user interface 560, if a user rubs the fifth user interface 550 to the right.

Furthermore, in the case of a situation that a user needs to input characters while the user is watching a digital broadcast and thus a user interface for inputting characters is further displayed, the user interface for inputting characters may be no longer displayed when the situation is over.

Figure 6:
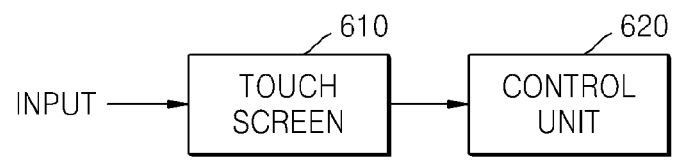
FIG. 6 is a diagram of a remote control device according to an exemplary embodiment of the present invention.

FIG. 6 is a diagram of a remote control device according to an exemplary embodiment of the present invention.

Referring to FIG. 6, the remote control device according to an exemplary embodiment of the present invention includes a touch screen 610 and a control unit 620.

The touch screen 610 detects an input for selecting one of a plurality of functions supported by an electronic device. Each time an input in a predetermined form is detected, the touch screen 610 sequentially displays a plurality of user interfaces one-by-one for controlling a function selected with the input.

At this point, the input in a predetermined form may be either touching the touch screen 610 or sliding from a first location to a second location across the touch screen 610, that is, rubbing.

The control unit 620 controls the electronic device by using one of the plurality of user interfaces sequentially displayed on the touch screen 610.

For example, when an input for instructing a TV to switch a current channel to a channel of which the number is higher than that of the current channel is detected via the touch screen 610, the control unit 620 controls the TV by transmitting a control instruction instructing the TV to switch the current channel to the channel of which the number is higher than that of the current channel.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

Alternatively, other exemplary embodiments of the present invention can be written as computer programs and can be implemented in general-use digital computers that execute the programs using a computer readable recording medium, the computer readable recording medium being a storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A portable electronic device for controlling a television device, the portable electronic device comprising:
   a touch screen; and
   a processor configured to:
      control the touch screen to display a first user interface (UI), among a plurality of UIs, for controlling the television device,
      while the first UI is displayed on the touch screen, in response to the television device performing a task for which inputting a character is necessary, control the touch screen to display a second UI, among the plurality of UIs, wherein the second UI is for inputting the character to the television device,
   control the television device based on a first user input received via the second UI for inputting the character, and
   while the second UI is displayed on the touch screen, in response to the task for character input being over, control the touch screen to no longer display the second UI, and
wherein the processor is further configured to:
   in response to a second user input while the first UI is displayed on the touch screen, control the touch screen to display a third UI for controlling a channel switching function of the television device, wherein the third UI being a different type of UI from the first UI.

2. The portable electronic device of claim 1, wherein the processor is further configured to, in response to the television device outputting a digital broadcast, control the touch screen to display a fourth UI for setting up a digital broadcast environment.

3. The portable electronic device of claim 1, wherein the first UI is for controlling the channel switching function of the television device.

4. The portable electronic device of claim 1, wherein the processor is further configured to control the touch screen to display a UI corresponding to a specific task being currently performed by the television device, among the plurality of UIs.

5. A non-transitory computer readable recording medium having recorded thereon a computer program configured to cause a portable electronic device for controlling a television device to perform operations comprising:
   displaying a first user interface (UI), among a plurality of UIs, for controlling the television device;
   while the first UI is displayed on the touch screen of the portable electronic device, in response to the television device performing a task for which inputting a character is necessary, displaying, on the touch screen, a second UI, among the plurality of UIs, wherein the second UI is for inputting the character to the television device;
   controlling the television device based on a first user input received via the second UI for inputting the character;
   while the second UI is displayed on the touch screen, in response to the task being over, no longer displaying the second UI,
   wherein the operations further comprise:
   in response to a second user input while the first UI is displayed on the touch screen, displaying, on the touch screen, a third UI for controlling a channel switching function of the television device, wherein the third UI being a different type of UI from the first UI.

6. The non-transitory computer readable recording medium of claim 5, the operations further comprising:
   in response to the television device outputting a digital broadcast, displaying, on the touch screen of the portable electronic device, a fourth UI for setting up a digital broadcast environment.

7. The non-transitory computer readable recording medium of claim 5, wherein the first UI is for controlling the channel switching function of the television device.

8. The non-transitory computer readable recording medium of claim 5, wherein the operations further comprise:
   displaying a UI corresponding to a specific task being currently performed by the television device, among the plurality of UIs.

9. A non-transitory computer readable recording medium having recorded thereon a computer program configured to cause a portable electronic device for controlling a television device to perform operations comprising:
   displaying a first user interface (UI), among a plurality of UIs, for controlling the television device;
   while the first UI is displayed on a touch screen of the portable electronic device, in response to the television device performing a task for which inputting a character is necessary, displaying, on the touch screen, a second UI, among the plurality of UIs, wherein the second UI is for inputting the character to the television device;
   receiving a first user input via the second UI for inputting the character to the television device;
   while the second UI is displayed on the touch screen, in response to the task no longer being performed by the television device, controlling the touch screen to remove display of the second UI,
   wherein the operations further comprise:
   in response to a second user input while the first UI is displayed on the touch screen, displaying, on the touch screen, a third UI for controlling a channel switching function of the television device, the third UI being a different type of UI from the first UI.

10. The non-transitory computer readable recording medium of claim 9, wherein the operations further comprise:
    in response to the television device outputting a digital broadcast, displaying, on the touch screen of the portable electronic device, a UI for setting up a digital broadcast environment.

11. The non-transitory computer readable recording medium of claim 9, wherein the first UI is for controlling the channel switching function of the television device.

12. The non-transitory computer readable recording medium of claim 9, wherein the operations further comprise:
    displaying a UI corresponding to a specific task being currently performed by the television device, among the plurality of UIs.

* * * * *